(12) United States Patent
Xie et al.

(10) Patent No.: US 10,322,761 B2
(45) Date of Patent: Jun. 18, 2019

(54) PILE-FREE PARKING MANAGEMENT SYSTEM AND METHOD

(71) Applicant: Jiangsu Hongpu Technology LTD., Wuxi, Jiangsu Province (CN)

(72) Inventors: Ruichu Xie, Wuxi (CN); Wenyu Xie, Wuxi (CN); Zikai Xie, Wuxi (CN)

(73) Assignee: Jiangsu Hongpu Technology LTD., Wuxi, Jiangsu Province (CN)

(*) Notice: Subject to any disclaimer, the term of this patent is extended or adjusted under 35 U.S.C. 154(b) by 0 days.

(21) Appl. No.: 16/068,888

(22) PCT Filed: Nov. 12, 2016

(86) PCT No.: PCT/CN2016/105548
§ 371 (c)(1),
(2) Date: Jul. 9, 2018

(87) PCT Pub. No.: WO2017/084539
PCT Pub. Date: May 26, 2017

(65) Prior Publication Data
US 2018/0354571 A1 Dec. 13, 2018

(30) Foreign Application Priority Data

Nov. 16, 2015 (CN) .......................... 2015 1 0775802
May 11, 2016 (CN) .......................... 2016 1 0309964

(51) Int. Cl.
*B62H 3/00* (2006.01)
*B62H 5/00* (2006.01)
*B62H 5/20* (2006.01)

(52) U.S. Cl.
CPC ................ *B62H 5/20* (2013.01); *B62H 3/00* (2013.01); *B62H 5/005* (2013.01); *B62H 2003/005* (2013.01)

(58) Field of Classification Search
CPC . B62H 5/20; B62H 3/00; B62H 5/005; B62H 2003/005
USPC ...................... 340/432, 425.5, 932, 937, 933
See application file for complete search history.

(56) References Cited

U.S. PATENT DOCUMENTS

| 5,917,407 A * | 6/1999 | Squire ...................... B62H 3/00 194/205 |
| 2011/0015934 A1* | 1/2011 | Rowe ...................... G06Q 30/02 705/1.1 |

FOREIGN PATENT DOCUMENTS

| CN | 102842185 A | 12/2012 |
| EP | 2913260 A1 | 9/2015 |

* cited by examiner

*Primary Examiner* — Daryl C Pope
(74) *Attorney, Agent, or Firm* — Jeanette Meng Nakagawa

(57) ABSTRACT

The present disclosure is for a pile-free parking management system and method comprising: an information manager which receives parking sensing information and locking information, and determines if a vehicle is properly parked and returned. The system comprises a plurality of sensing units each with a sensor and a sensing object installed onto and paired with a parking location and a vehicle. These sensing units are activated only when the sensor is aligned with the sensing object within a predetermined proximity of each other. Either the sensors and/or the sensing objects are installed at a parking location in a strategic and organized fashion. This system and method aim to maximize vehicle-parking capacity, and ensures orderly parking at the same time.

20 Claims, 4 Drawing Sheets

PILE-FREE PARKING MANAGEMENT SYSTEM AND METHOD

TECHNICAL FIELD

The invention relates to the technical field of public transportation management, particularly a pile-free parking management system and method.

BACKGROUND

Public bicycles are environment-friendly means of transportation. They have been widely offered as the municipal convenience-for-people works, bring convenience to the outgoing of citizens and meet requirements of environmental protection. The existing renting system of public bicycles adopts the pile control. Set up a machine station and locking piles at the renting station. Push a bicycle returned into a vehicle locking pile. A vehicle locking pile is equipped with a vehicle lock inside. Such vehicle lock identifies and locks the bicycle and sends the vehicle returning information to the machine station for management. This system has many defects. (1) Land resource: The arrangement of vehicle renting station requires a large open land. The land resource is scarce and expensive in cities, particularly at metro stations or commercial districts with a high flow of people. However, vehicle locking piles must be arranged with bicycles alternately, which occupies much parking space and reduces the parking density at the renting station. (2) User experience during rush periods. Usually rush periods are the peak hours of bicycle use. Both vehicle renting and returning must be accomplished by vehicle locking piles. When a renter rides a bicycle to the destination and finds no unused vehicle locking pile available, the renter cannot return the bicycle and may feel anxious. The renter has to call the remote service for manual intervention or vehicle allocation. The service is extremely busy during rush periods and may not answer the request promptly, which reduces the user satisfaction greatly. Vehicle locking piles have been an insurmountable bottleneck in service and increase the labor cost in operation and maintenance. (3) Cost. The vehicle locking piles take the largest portion of construction cost of a vehicle renting system. The vehicle locking piles and their baseplate consume a great deal of steel materials. All of these involve the energy consumption and environmental issues while increase the construction and maintenance cost of public bicycle systems. In fact, most of public bicycles have integrated electric, mechanical or other locks at present. These locks are mainly used to lock bicycles temporarily on the way. When a bicycle is returned at a renting station, it is locked by a lock in a vehicle locking pile rather than such built-in lock, resulting in the construction redundancy of lock. In general view, the existing parking management system and method of public bicycles need improving for economy and environmental protection.

ART

On account of defects in the existing vehicle locking management of public bicycles by means of vehicle locking piles, the applicant offers a well-constructed pile-free parking management system and method in order to save the space of renting station, reduce the construction and maintenance costs and improve the user experience.

SOLUTION

Technical Solution

The invention utilizes the following technical solution:

A pile-free parking management system and method. The system comprises an information manager, a locking sensor, a vehicle lock, and at least one group of parking sensing units. The parking sensing units described are proximity sensing units, optical sensing units or contact sensing units or the combination of them, consisting of a pair of sensors and sensing objects. The sensors and the sensing objects described are respectively arranged on any one of a vehicle or the ground. The parking sensing units supply parking sensing information to the information manager. Vehicle locks are arranged on vehicles. The locking sensor supplies locking information to the information manager, and the information manager is arranged on a ground machine station or the vehicle, and manages a parking state.

Further improvements of the abovementioned technical solution:

The parking sensing information descried is a switching signal or a enabling signal.

At least one group of parking sensing units comprises reed switches and magnetic materials.

Parts of parking sensing units on the ground are arranged along a straight line or a curve positively or obliquely, or into a scattered or regular lattice.

Multiple parking sensing units are arranged symmetrically or asymmetrically.

Multiple parking sensing units are parking sensing units of different types arranged symmetrically along the vehicle centerline, or parking sensing units of the same type arranged asymmetrically along the vehicle centerline.

Install two sensors of different types, or several sensors of the same type asymmetrically on a vehicle. These sensors correspond to sensors on the ground to realize the vehicle parking.

At least one group of parking sensing units comprises Hall sensors and magnetic materials.

The information manager and Hall sensors described are arranged on a vehicle to form an electrical loop. Magnetic materials are arranged on the ground near a parking stall at the station.

At least one group of parking sensing units comprises magnet resistive sensors and magnetic materials.

A guide is also arranged.

A parking management method for the abovementioned pile-free parking management system. When a sensing object approaches to or contacts a sensor, the parking sensing information is sent to the information manager. After a vehicle is locked, a locking sensor sends the locking information to the information manager. After receiving at least the parking sensing information and the locking information, the information manager will determine if the vehicle returning conditions are met and manage the parking.

Further improvements of the abovementioned technical solution:

At least one group of parking sensing units described is arranged to be the circuit switch. After sensors are triggered by sensing objects, the circuit turns on or is activated and the information manager is wakened. Such switching signal or enabling signal is the part of parking sensing information described.

After the information manager described starts, it controls the parking sensing units of other groups or processes the information. After receiving the locking information, the information manager will determine if the vehicle returning conditions are met.

Multiple groups of parking sensing units are arranged symmetrically or asymmetrically. The information manager decides if parking meets requirements by processing the parking sensing information provided by parking sensing units.

The Hall sensors of parking sensing units are triggered by magnetic materials and the parking sensing information generated is received by the information manager.

A positioning parking system comprising of an information manager and at least one group of parking sensing units. The information manager is arranged on a vehicle. Each group of parking sensing units comprises a group of sensors and sensing objects. Sensors are arranged on a vehicle and electrically connected to the information manager. Sensing objects are arranged on the ground. When sensors approach to or contact sensing objects, the sensing information is generated. Such sensing information may be the switching signal or sensing signal. The information manager processes the sensing information and then determines if a vehicle is parked properly.

A vehicle parking positioning system comprising of an information manager and at least one group of parking sensing units. The parking sensing units described are proximity sensing units, optical sensing units or contact sensing units or the combination of them, consisting of a pair of sensors and sensing objects. The sensors and the sensing objects described are respectively arranged on any one of a vehicle or the ground. The parking sensing units supply parking sensing information to the information manager. Vehicle locks are arranged on vehicles. The locking sensor supplies locking information to the information manager, and the information manager is arranged on a ground machine station managing the parking on the ground or the vehicle, and manages a parking state.

An autonomous parking system arranging vehicles tidily. At least one group of parking sensing units is arranged between a vehicle and the ground at the station. The parking sensing units described are proximity sensing units, optical sensing units or contact sensing units or the combination of them, consisting of a pair of sensors and sensing objects. The sensors and the sensing objects described are respectively arranged on any one of a vehicle or the ground.

A vehicle arranged with magnetic sensor, comprising of an information manager and at least one group of magnetic sensors. The information manager and magnetic sensors are arranged on and electrically connected to a vehicle. When magnetic sensors approach to sensing objects, they will be triggered to send the switching signal or enabling signal to the information manager in order to start the information manager.

A bicycle foot arranged with sensors at the bottom. Such sensors are wired or wirelessly connected to the vehicle information manager.

BENEFICIAL EFFECTS OF THE INVENTION

Beneficial Effects

This invention eliminates vehicle locking piles at vehicle renting stations. Save the space greatly and enable the high-density arrangement of bicycles. Thus, improve the utilization of unit area. This invention is particularly suitable for arrangement of vehicle renting stations at the downtown area, metro entrances and other places with a high land cost, bringing more convenience to the outgoing of citizens. In addition, parking stalls identified by sensing objects on the ground are just for indication and triggering in this invention. Have and need no any rigid permanent connection with bicycles. To return a bicycle during the rush periods, a user can just move any bicycle out of its parking stall to one side of the renting station, realize the triggering and return the bicycle if all parking stalls in a renting station are occupied. Therefore, the vehicle returning time and process are saved considerably and no manual intervention is required. This invention eliminates vehicle locking piles, simplifies the system structure, reduces the construction and maintenance cost, resolves the bottleneck of vehicle locking piles and offers the significant economy.

By arranging more than one parking sensing unit, this invention realizes the orderly and tidily arranging bicycles returned in the vehicle renting station by autonomous parking of a user under an unattended situation, effectively reduces the operating cost, reduces the labor cost input, and increases the attractiveness of the city appearance.

This invention utilizes parking sensing units as starter of information manager to start an information manager on a vehicle or on the ground. Such information manager on a vehicle or on the ground is in the sleep or low-power running state at other times, effectively avoiding or reducing the energy consumption effectively, saving the energy and protecting the environment better.

BRIEF DESCRIPTION OF ACCOMPANYING DRAWINGS

In which, 1. 1. Information manager; 2. Parking sensing unit; 3. Locking sensor; 4. Vehicle lock; 5. Locking information; 6. Guide; 7. Parking sensing information; 8. Sensor; 9. Sensing object; 10. Machine station; 81. Reed switch; 91. Magnetic steel; 82. Optical receiving sensor; 92. Laser transmitter; 93. Laser Preferred Embodiments of the Invention
Preferred Embodiment of the Present Invention A more detailed description of the invention embodiment follows with reference to accompanying drawings.

Figure 1:
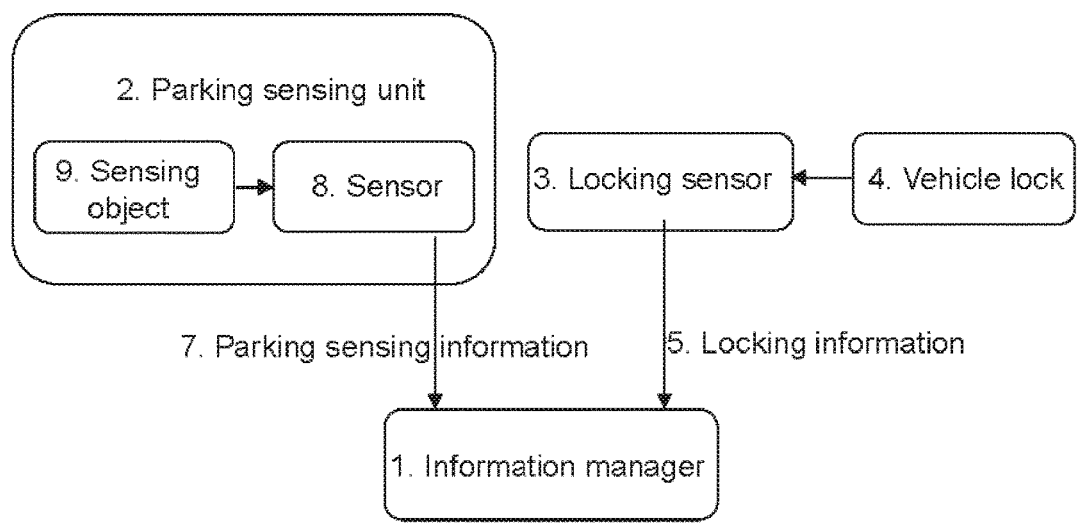
FIG. 1 is a schematic drawing of management method embodying the present invention.

As shown in FIG. 1, a pile-free parking management system and method described in the present invention comprises an information manager 1, parking sensing units 2 and a locking sensor 3. Each group of parking sensing units 2 consists of a pair of sensors 8 and sensing objects 9. When sensors 8 approach to or contact sensing objects 9, the sensing information 7 is generated. Such sensing information 7 may be the switching signal or sensing signal. The information manager 1 processes the sensing information 7 and then determines if a vehicle is parked properly. Locking sensor 3 is arranged near a vehicle lock 4. Locking sensor 3 sends the locking information 5 to the information manager 1. After receiving the parking sensing information 7 and the locking information 5, the information manager 1 will determine that the vehicle returning conditions are met, implement the subsequent procedure, including communication with the host computer or information recording by read and write and monitor and manage vehicles parked properly.

Information manager 1 can be arranged on any bicycle or fixed permanently at a vehicle renting station. Sensors 8 and sensing objects 9 of parking sensing units 2 are respectively arranged on any one of a vehicle or the ground. Sensors 8 send information to information manager 1 by means of wired or wireless electrical connection. Locking sensor 3 is arranged on a vehicle, sending information to information manager 1 by means of wired or wireless electrical connection.

Embodiments of the Invention

Embodiments of the Present Invention

Figure 2:
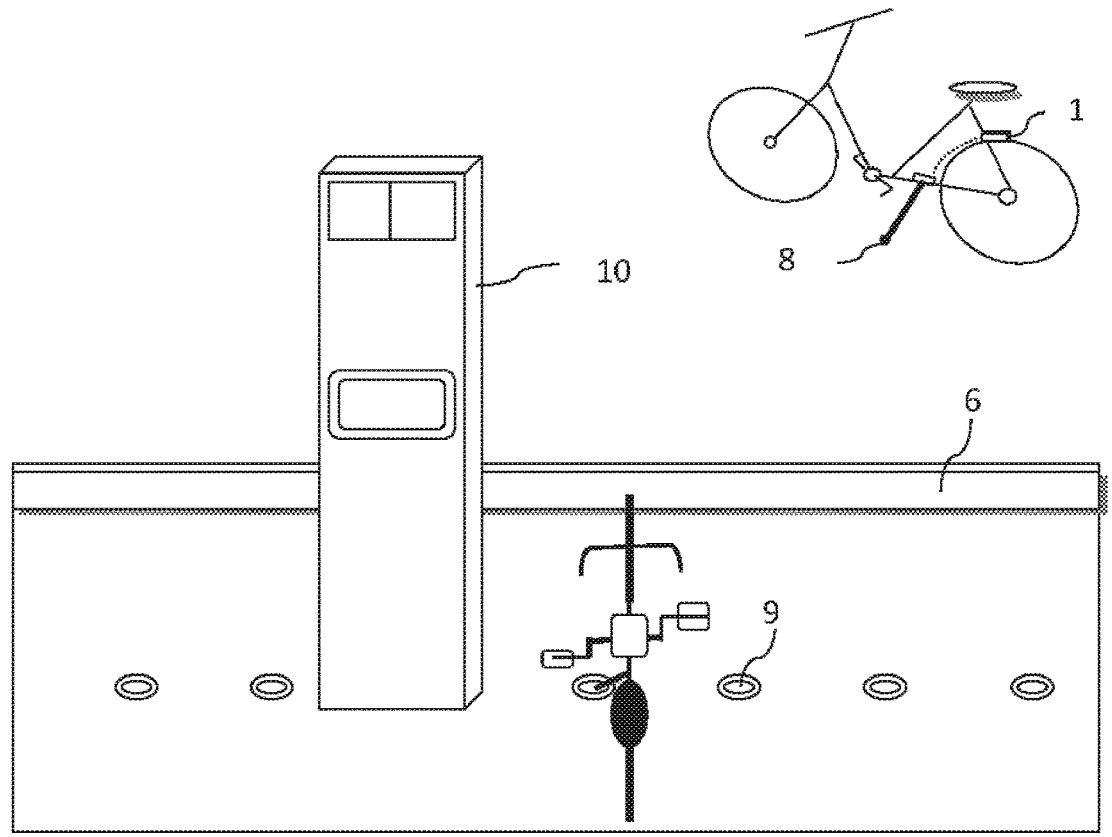
FIG. 2 is a general view of management system embodying the present invention as embodiment 1.

Embodiment 1:

As shown in FIG. 2, parking sensing units 2 utilized in the present invention are magnetic proximity switches. The proximity switch is a prior art so that it is not detailed herein. A bicycle is arranged with an information manager 1, parking sensors 8 and a vehicle lock 4. Vehicle lock 4 can be an electric control lock or a mechanical lock. Locking sensor 3 is also arranged on a bicycle to give the information feedback on the opening and closing state of vehicle lock. Vehicle-mounted Information manager 1 at least monitors and processes signals from parking sensors 8 and locking sensor 3. Parking sensors 8 are magnetic components such as reed switch 81. To meet the requirement of trigger distance, the reed switch 81 can be arranged on the bicycle foot or the lower frame near the ground and electrically connected to vehicle-mounted information manager 1 in the wired or wireless manner. Vehicle renting stations are arranged with ground sensing objects 9 such as magnetic steel 91 and these positions are identified obviously. When reed switch 81 approaches to magnetic steel 91, reed switch 81 is triggered to generate the switching signal or sensing signal under the effect of magnetic field. Magnetic steel 91 in this embodiment is a passive sensing object and can be arranged on the ground easily without a power source. Just drill at the designated position on the ground, embed magnetic steel 91 and consolidate it with cement or another binding material, and finally arrange or coat the stall sign on the ground. A host computer is management machine station 10 arranged at a vehicle renting station or a remote central server. It receives or processes the information from vehicle-mounted manager 1 by means of information communication to manage bicycles at a vehicle renting station.

In practice, a user just pushes a bicycle to a parking stall identified on the ground and puts down the bicycle foot there when returning the bicycle. At this moment, reed switch 81 on the bicycle foot is triggered magnetically by magnetic steel 91 and generates the parking sensing information 7. Meanwhile, the user locks the bicycle with vehicle lock. After the bicycle is locked successfully, the vehicle-mounted locking sensor 3 is triggered and sends the locking information to the vehicle-mounted information manager 1. After receiving the parking sensing information 7 and the locking information 5, vehicle-mounted information manager 1 will determine that the vehicle returning conditions are met and implement the subsequent procedure.

After it is returned, a bicycle can be moved rather than restrained and fixed at a parking stall on the ground in the present invention. To return a bicycle, therefore, a user can just move any returned bicycle out of its parking stall to one side of the renting station, park the bicycle to be returned in such parking stall and trigger the implementation of locating information sensing if all parking stalls in a renting station are occupied during rush periods. The vehicle returning time and process are saved considerably and no manual intervention is required. By means of video monitoring on vehicle renting stations, or information communication established between a vehicle in the returned state and a vehicle renting station, a vehicle renting station or a vehicle will send an alarm or other messages to implement the anti-theft information management of bicycle if the vehicle is moved beyond the communication distance limit.

Embodiment 2:

Parking sensing units 2 adopted in this embodiment are metallic information sensors. Such metallic information sensor is a prior art so that it is not detailed herein. In this embodiment, a bicycle is arranged with a vehicle lock 4, a locking sensor 3 and metallic sensing objects 9 like wheels or foot. Metallic sensors 8 are arranged on the ground. Information manager 1 is arranged in the machine station 10 in a vehicle renting station. Metallic sensors 8 on the ground send the information to information manager 1 in the machine station by means of electric connection. When a vehicle is parked at a parking stall of station, metallic sensors 8 and metallic sensing objects 9 will generate the parking sensing information 7. And locking information 5 will also be sent from vehicle-mounted locking sensor 3 to information manager 1 in the machine station 10. After receiving two signals, information manager 1 will determine that the vehicle returning conditions are met.

Metallic sensors 8 on the ground can be coded in this embodiment so that information manager 1 can manage parking stalls. Likewise, embodiments of the present invention do not restrict the arrangement of sensors 8 and sensing objects 9 of parking sensing units 2. For example, magnetic steel 91 is arranged on a vehicle and reed switch 81 is arranged on the ground in embodiment 1. By means of the electrical connection between reed switch 81 on each parking stall and machine station 10 or other control units, the enabling signal is responded and the parking stall can be located to realize the parking stall management.

Embodiment 3:

Parking sensing units 2 in this embodiment include chips and card readers. Chips may be IC chips, RFID chips and other chips. It is a prior art so that it is not detailed herein. In this embodiment a bicycle is arranged with vehicle lock 4, locking sensor 3, information manager 1 and card reader. The card reader may be arranged on the foot or any part of a bicycle near to the ground. Readable chips like RFID chips are arranged on the ground. RFID chips memorize the code of parking stall and other relevant information. When a user returns a vehicle, the card reader reads out the memory of RFID chip and sends parking sensing information 7 to vehicle information manager 1. Vehicle-mounted locking sensor 3 also sends locking information 5 to vehicle information manager 1 after it is triggered. After receiving both signals, information manager 1 determines that the vehicle returning conditions are met and manages the parking stalls at a vehicle renting station.

Likewise, readable chips are arranged on any part of a bicycle near to the ground and card readers are arranged on the ground. Information manager 1 is arranged in a vehicle station. Card readers integrate sensors receiving sensing information from sensing objects. Vehicles are arranged with locking sensors. Adopt the similar parking way to achieve the same effect of pile-free parking management.

Embodiment 4:

Parking sensing units 2 utilized in this embodiment are optical sensing units, such as IR or laser transmission self-return receiving sensor. Light transmission self-return receiving sensors are fixed on bicycles. Light reflection or absorption regions are arranged on the ground. Optical sensing is a prior art so that it is not detailed herein. When a bicycle arrives at a designated stall and parks, the laser transmitter transmits laser and the light reflection or absorption region on the ground reflects or absorbs the laser transmitted. If the receiving sensor acquires or does not acquire the light information, parking sensing information 7 is generated.

Figure 3:
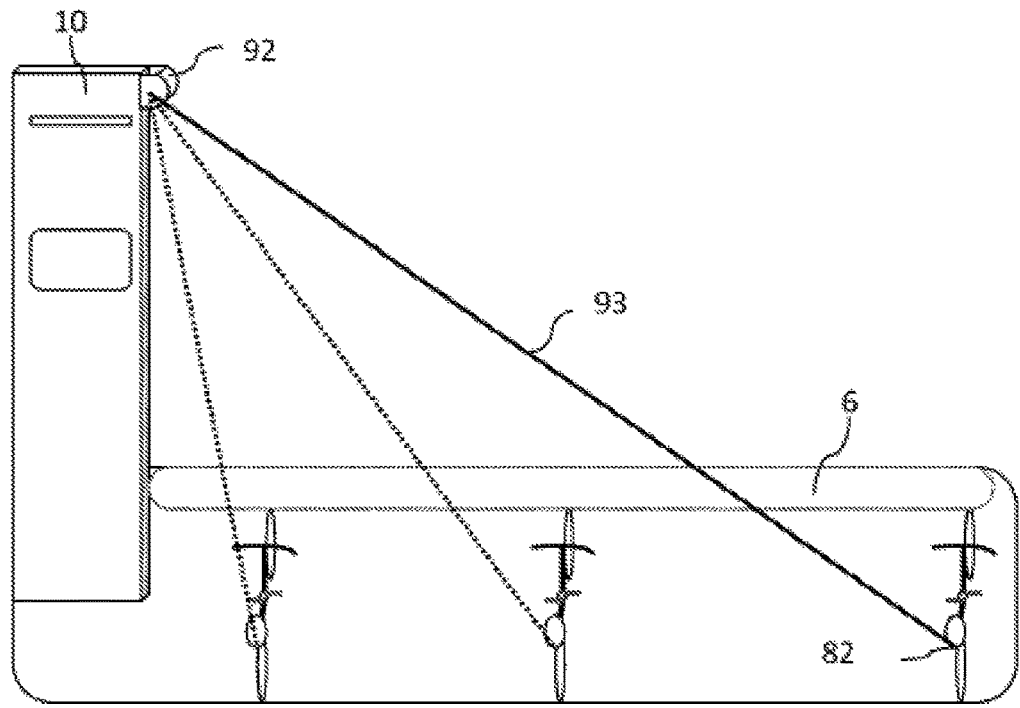
FIG. 3 is a general view of bicycles in embodiment 5.

Embodiment 5:

Parking sensing units 2 utilized in this embodiment are optical sensing units, such as IR or laser transmitter and receiving sensors. Optical sensing is a prior art so that it is not detailed herein. As shown in FIG. 3, laser transmitter 92 can be arranged at the machine station 10 of a vehicle renting station or a higher object. Its transmitting range covers a corresponding vehicle renting station. It transmits laser 93 to identify or guide a parking stall on the ground. Optical receiving sensor 82 is arranged on a bicycle. To return a vehicle, a user parks the vehicle at a stall indicated by laser 93. After vehicle-mounted optical sensor 82 receives laser 93 signal, parking sensing information 7 is generated, indicating the proper parking. In this embodiment, laser transmitter 92 is equipped with a depression angle regulator that controls the angle of transmitter to change the light transmitting position and to identify and guide parking stalls for following bicycles to park. Laser receiving sensor 82 is equipped with an elevation angle regulator that a user applies to adjust and receive laser 93 according to the angle of light beam transmitted.

Embodiment 6:

Parking sensing units 2 utilized in this embodiment are contact sensing units, such as contact switches arranged on the ground or vehicles. Contact switch is a prior art so that it is not detailed herein. If contact switches are arranged on the ground, foot of a bicycle properly parked touches and triggers a contact switch, sending parking sensing information 7 to information manager 1.

Embodiment 7:

This embodiment utilizes contact chips as sensing objects 9 on the ground. Vehicle-mounted sensors 8 comprise one positive contact wire and one negative contact wire. Both wires are connected to information manager 1. In practice, such wires contact the chip of a sensing object 9 correspondingly. Utilize the carrier circuit to transmit the chip information for parking stall management and positioning.

Embodiment 8:

Each parking stall is arranged with a sensing object 9 or sensor 8 on the ground in abovementioned embodiments. Such sensing object or sensor corresponds to sensors 8 or sensing objects 9 of vehicle-mounted parking sensing unit 2. As there is just one supporting point, vehicles may be parked in any direction around sensing object 9, resulting in the untidy parking and the poor space utilization. With reference to FIG. 2 or FIG. 3, guides 6 may be arranged in front of vehicles, such as wheel groove, in order to fix the wheel direction and realize the orderly parking.

Figure 4:
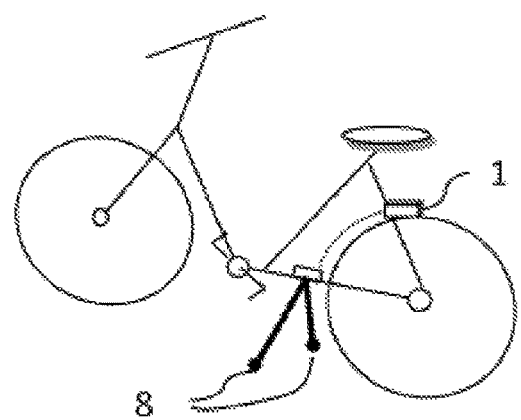
FIG. 4 is a general view of bicycles in embodiment 8.

Some vehicle renting stations require the flat ground without blocks, guides 6 or other physical barriers. Therefore, a bicycle is equipped with at least two parking sensing units 2 as shown in FIG. 4 in this embodiment. Bicycles are arranged with two feet. Each foot is arranged with sensor 8 and two sensing objects 9 are arranged on the ground. A vehicle must be parked at a designated stall as instructed. When two sensors 8 approach to sensing objects 9 on the ground, they send two pieces of sensing information 7. Information manager 1 will determine that the vehicle returning conditions are met only after receiving both pieces of sensing information 7 and locking information 5. If only one piece of parking sensing information 7 is received, it indicates that a vehicle is not parked in accordance with instructions. And information alert units will suggest the user parking the bicycle again as instructed. Hence, users can orderly and tidily arrange bicycles by autonomous parking under an unattended situation.

Figure 5:
FIG. 5 is a straight-line layout of ground sensing objects in embodiment 8.
Figure 6:
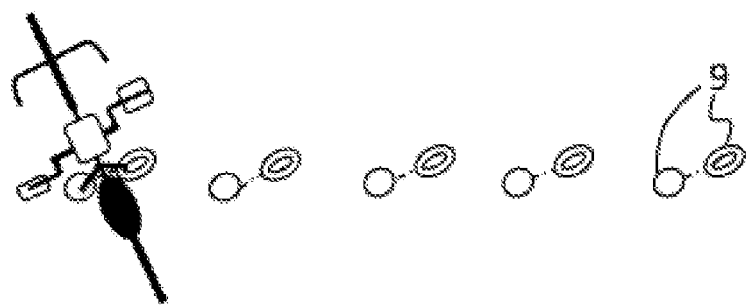
FIG. 6 is an oblique layout of ground sensing objects same as FIG. 5.
Figure 7:
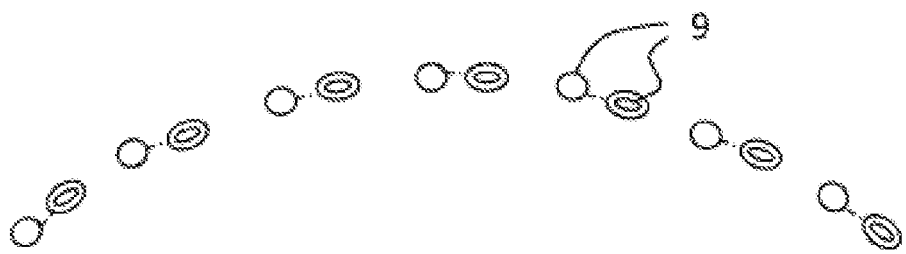
FIG. 7 is a curve layout of ground sensing objects same as FIG. 5.

Sensing objects 9 on the ground in this embodiment can be arranged according to the actual space of vehicle renting stations. Under normal circumstances, for example, each group of sensing objects 9 is arranged along a straight line so that bicycles can be arranged positively in parallel (with reference to FIG. 5). In a narrow area, bicycles have to be parked obliquely so that each group of sensing objects 9 is arranged at a certain angle in parallel (with reference to FIG. 6). In a cambered area, each group of sensing objects 9 is arranged in an arc (with reference to FIG. 7). Of course, they can be arranged into a scattered or regular lattice. So, the pile-free parking system described in the present invention is suitable for all kinds of lands and easy for parking and management.

It should be pointed out that two groups of parking sensing units 2 in this embodiment are unnecessary to be of the same type. For example, one sensing object can be of magnetic type and the other sensing object can be of metallic type. Likewise, two sensors on a bicycle should be relevant magnetic sensor or metallic sensor. By this means, sensors will not be triggered by sensing objects on the ground even though bicycles are parked reversely. Alternatively, magnetic sensing objects combine readable chips, or optical sensing units, or light absorption sensing units combine light feedback sensing units. The present invention allows for three or more groups of sensing objects rather than limit to two groups. Combination of different sensing objects cannot only prevent vehicles from parking in the reverse way and realize the orderly and tidy parking under an unattended situation, but also implement the parking management or achieve anti-theft or any other purpose by means of readable chips.

Figure 8:
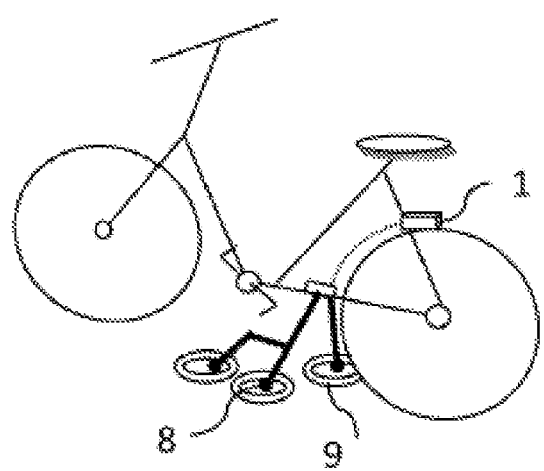
FIG. 8 is a layout of bicycles and ground sensing objects in embodiment 9.

Embodiment 9:

Parking sensing units 2 in embodiment 8 are arranged symmetrically. As shown in FIG. 8, multiple groups of parking sensing units 2 are arranged asymmetrically in this embodiment. For example, equip one foot with two sensors 8 in the front and in the rear and the other foot with a sensor 8. Correspondingly, arrange three sensing objects 9 asymmetrically on the ground along the centerline of a bicycle. If such asymmetric arrangement is adopted, vehicles must be parked in strict compliance with the indication on the ground. If a bicycle is parked in the reverse or willful way, information manager 1 will determine that its returning conditions are not met because it does not detect its parking sensing information 7 and suggest the user to park such bicycle as instructed. Of course, using two groups of parking sensing units 2 asymmetrically arranged can also realize orderly parking. Two or more groups of parking sensing units 2 in this embodiment are of the same type, such as reed switch 81 and magnetic steel 91. The autonomous orderly parking can be realized by such asymmetric arrangement of location.

Embodiment 10:

One and more groups of parking sensing units 2 utilized in the foregoing embodiment send parking sensing information 7 to information manager 1. And locking sensor 3 provides locking information 5 to information manager 1. There is no strict requirement for sequence of these two signals. When receiving them during a given period, information manager 1 will determine that the vehicle returning conditions are met.

Figure 9:
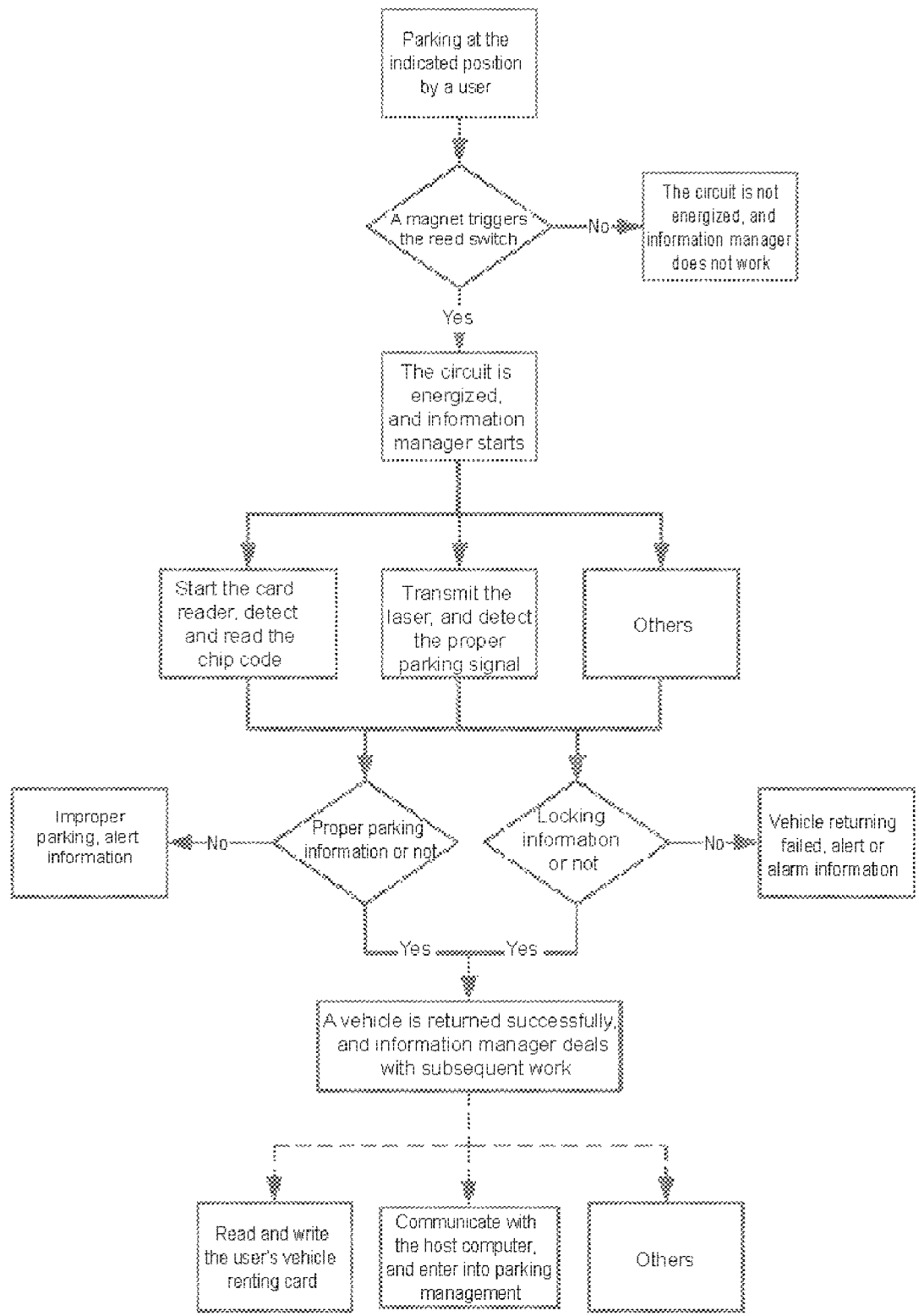
FIG. 9 is a work flow diagram of embodiment 10.

Multiple groups of parking sensing units 2 are arranged in this embodiment and one group of parking sensing units 2 functions as starting switch. When a bicycle is in normal use or ridden, vehicle-mounted information manager 1 will be in the sleep or low-power running state and not monitor any signal, avoiding or reducing the energy consumption. As shown in FIG. 9, when a bicycle parks at a designated parking stall in a vehicle renting station, vehicle-mounted sensors 8 like reed switch 81 will be triggered by sensing objects 9 like magnetic steel 91 at such parking stall and send the switching signal or enabling signal. The circuit is energized and starts information manager 1. Then information manager 1 starts the encoder reader to read codes in the above-mentioned embodiment or activates laser to identify signs on the ground. Read locking information 5 and then determine if the vehicle returning conditions are met. Carry out the subsequent procedure, such as read and write a vehicle renting card, or communicate with the host computer to manage vehicles in a vehicle renting station, after foregoing steps are done successfully. So, parking sensing units function as starting switch of information manager or send the enabling signal in this embodiment, starting the vehicle or renting station information manager.

Embodiment 11:

This embodiment is same as embodiment 1. Parking sensors 8 are Hall sensors with magnetic component or magnetoresistive sensors. Hall sensor or magnetoresistive sensor is a prior art and available on the market so that it is not detailed herein. Hall sensors or magnetoresistive sensors are arranged on a part of vehicle near the ground, such as foot, and electrically connected to information manager 1. When a bicycle is parked, Hall sensors or magnetoresistive sensors are triggered by sensing objects like magnetic steel, and send parking sensing information 7 to be acquired by information manager 1. Hall sensors or magnetoresistive sensors consume little electricity so that the circuit does not take much power even though it always keeps on.

Zero pile referred to in the present invention does not mean that no any device is arranged on the ground. Compared to the existing technology, it just means the elimination of vehicle locking piles. In all embodiments of the present invention, sensing objects or sensors on the ground cover those in flush with or a little above the ground rather than strictly limit to those under the ground. The scope of protection of the present invention also covers those arranged on the ground indirectly via objects.

The proper parking signal and locking information referred to in the present invention are just for easy description and understanding. Neither of them is a digital or analog signal in the strict sense. It just represents a change of enabling threshold and also includes the on-off signal. And such signal transmission is not strictly limited to the unidirectional transmission. It may be sent from sensors to information manager, or information manager monitors or reads the signal from sensors proactively.

Abovementioned description is the explanation of the present invention rather than restrictions. The present invention is subject to change in any form, providing that the spirit of the present invention is not offended.

What is claimed is:

1. A pile-free parking management system comprising:
   an information manager installed onto a vehicle;
   at least one parking sensing unit further comprises a sensor and a sensing object installed at a parking location and onto a vehicle as a complementarily pair, wherein the parking sensing unit is activated when the sensor is aligned with the sensing object within a predetermined proximity of each other, and transmits the vehicle's parking sensing information to the information manager; and
   a locking sensor in communication with a vehicle lock, which transmits and receives locking/unlocking commands and lock status information to and from the information manager.

2. The pile-free parking management system of claim 1, wherein the parking sensing units further comprises a plurality of sensing objects pre-installed on grounds of the parking location with/without a power source in an organized fashion.

3. The pile-free parking management system of claim 1, wherein the parking sensing units further comprises a plurality of sensors pre-installed on grounds of the parking location in an organized fashion.

4. The pile-free parking management system of claim 1, wherein at least one sensor and/or one sensing object is further coupled with physical guides to facilitate accurate orientation and placement of the vehicle.

5. A pile-free parking management system of claim 1, wherein the parking sensing units are proximity sensing units, contact sensing units, chip and card readers, and/or a combination thereof.

6. The parking sensing units of claim 5 are installed onto the vehicle at asymmetrical locations with respect to the vehicle's centerline to facilitate accurate orientation and placement of the vehicle during parking.

7. The parking sensing units of claim 5 further comprises a combination of at least two types of sensing units installed onto the vehicle, and are paired with corresponding sensors and/or sensing objects at the parking location to facilitate accurate orientation and placement of the vehicle during parking.

8. The parking sensing units of claim 5 further comprises a plurality of same type of sensing units installed asymmetrically, and are paired with corresponding sensors and/or sensing objects at the parking location to facilitate accurate orientation and placement of the vehicle during parking.

9. The pile-free parking management system of claim 1, wherein at least one sensor is installed on a foot of a vehicle's stand and activates the sensing object only when both are aligned within a predetermined proximity of each other.

10. The pile-free parking management system of claim 1, wherein a plurality of sensors are installed on a plurality of feet of a vehicle's stand and activate the corresponding sensing objects only when all are aligned within a predetermined proximity of each other.

11. The pile-free parking management system of claim 1, wherein the information manager is in sleep mode until wirelessly activated by the parking sensing unit.

12. The pile-free parking management system of claim 1, wherein the information manager communicates with a parking station to receive and to send parking status information of the vehicle.

13. The pile-free parking management system of claim 1, wherein the information manager communicates with a user's mobile device to receive and to send parking status of the vehicle.

14. A pile-free parking management system and method comprising:

an information manager installed onto a vehicle which receives parking sensing information and locking information to determine a vehicle's proper parking conditions and requirements;

at least one parking sensing unit each comprises a sensor and a sensing object installed at a parking location and onto a vehicle as a complementarily pair, wherein at least one parking sensing unit is activated when the sensor is aligned with the sensing object within a predetermined proximity of each other, and transmits the vehicle's parking sensing information to the information manager; and a locking sensor in communication with a vehicle lock, which transmits and receives lock/unlock command and locking status information to and from the information manager.

15. The pile-free parking management system and method of claim 14, wherein the parking sensing units are proximity sensing units, contact sensing units, chip and card readers, and/or a combination thereof.

16. The pile-free parking management system and method of claim 14, wherein the parking sensing units further comprise a plurality of sensing objects pre-installed on grounds of the parking location with/without a power source in an organized fashion.

17. The pile-free parking management system and method of claim 14, wherein the parking sensing units further comprise a plurality of sensors pre-installed on grounds of the parking location in an organized fashion.

18. The pile-free parking management system and method of claim 14, wherein at least one sensor and/or one sensing object is further coupled with physical guides to facilitate accurate orientation and placement of the vehicle.

19. The pile-free parking management system and method of claim 14, wherein a properly parked vehicle is allowed to be relocated within a pre-determined boundary designated to the parking location.

20. A pile-free parking management system comprising:

an information manager installed at a vehicle rental station;

at least one parking sensing unit further comprises a sensor and a sensing object installed at a parking location and onto a vehicle as a complementarily pair, wherein the parking sensing unit is activated when the sensor is aligned with the sensing object within a predetermined proximity of each other, and transmits the vehicle's parking sensing information to the information manager; and a locking sensor in communication with a vehicle lock, which transmits and receives locking/unlocking commands and lock status information to and from the information manager.

* * * * *